United States Patent

[11] 3,609,681

| | | |
|---|---|---|
| [72] | Inventor | John R. Saul<br>1301 Cochise, Arlington, Tex. 76010 |
| [21] | Appl. No. | 826,792 |
| [22] | Filed | May 22, 1969 |
| [45] | Patented | Sept. 28, 1971 |

[54] CONTROL CIRCUIT FOR ALTERNATELY FLASHING AUTOMOBILE HEADLAMPS
4 Claims, 1 Drawing Fig.

[52] U.S. Cl. .................................. 340/76, 315/83, 340/83
[51] Int. Cl. .................................. B60q 1/46
[50] Field of Search ........................... 340/76, 83; 315/77, 82, 83

[56] References Cited
UNITED STATES PATENTS

| 2,655,642 | 10/1953 | Ayres et al. | 340/83 |
| 2,706,809 | 4/1955 | Hollins | 340/81 |
| 3,002,127 | 9/1961 | Grontkowski | 340/331 X |
| 3,040,207 | 6/1962 | Grontkowski | 340/81 F UX |
| 3,483,509 | 12/1969 | De Coye De Castelet | 340/81 |
| 3,493,926 | 2/1970 | Morena | 340/76 |

FOREIGN PATENTS

| 1,001,905 | 1/1957 | Germany | 340/81 |

*Primary Examiner*—John W. Caldwell
*Assistant Examiner*—Kenneth N. Leimer
*Attorney*—Giles C. Clegg, Jr.

ABSTRACT: A control circuit for the headlamps of a vehicle includes the conventional switches for high beam and low beam control; and includes an additional circuit for effecting alternate blinking or flashing of the high beam lamps or filaments with override for continuous illumination by the high beam lamps or filaments when desired.

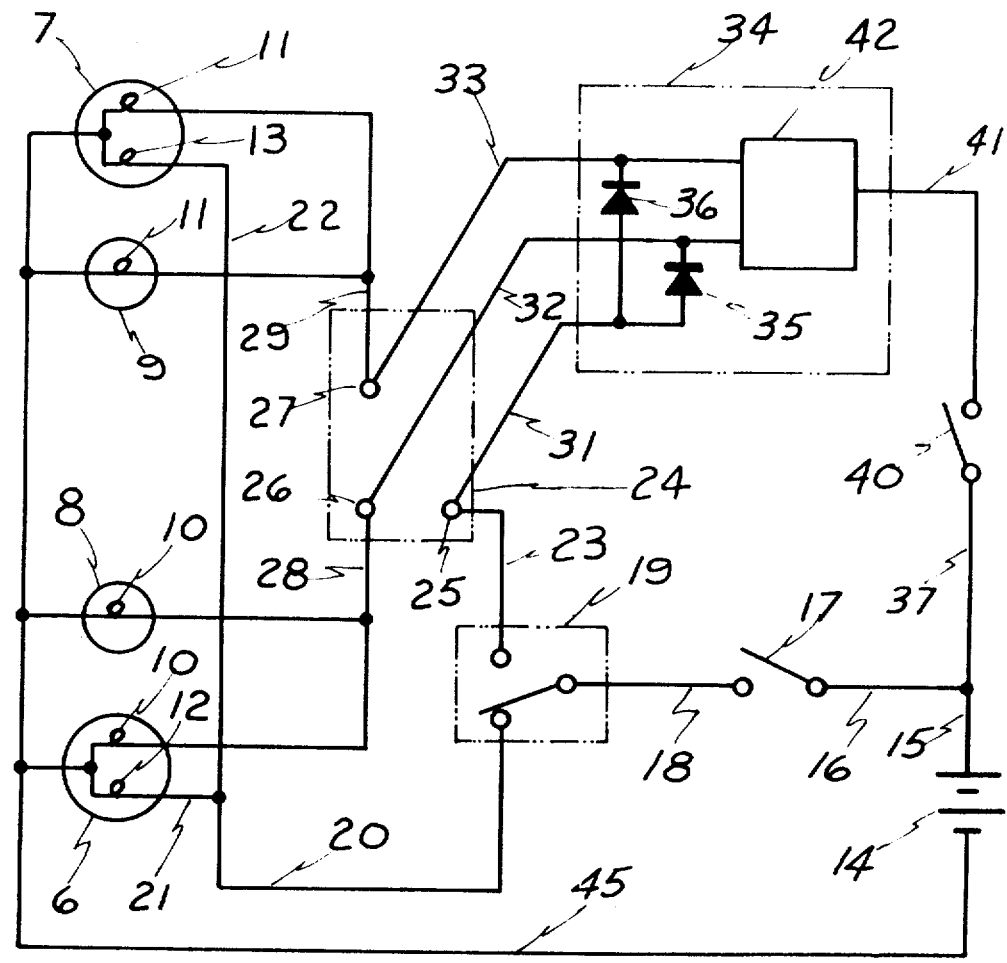

CONTROL CIRCUIT FOR ALTERNATELY FLASHING AUTOMOBILE HEADLAMPS

BACKGROUND OF THE INVENTION

This invention relates to a control circuit for selective continuous or alternating energization of a pair of warning devices such as incandescent lamps; and, more particularly, to a control circuit for the headlamps of an emergency vehicle for selectively effecting the alternate flashing of the high beam lamp filaments while not interfering with alternative normal headlamp control.

The invention is particularly directed to improved visual warning means to be provided on emergency vehicles, such as law enforcement vehicles, fire-fighting vehicles, and ambulances. The effectiveness of audible warning devices for such emergency vehicles leaves something to be desired with respect to the occupants of other vehicles, such as automobiles, for a number of reasons. The very common use of radios in automobiles and other vehicles produces background noise which, of course, must be overcome by audible warning devices. With the increasingly common use of air conditioners in automobiles, the combination of a closed vehicle and the background noise of air blowers greatly reduces the likelihood of the occupant's hearing audible warning devices. The same situation exists, of course, in the cooler months when automobile heaters are operating. Additionally, car manufacturers are continuously seeking to make their vehicles quieter with noise insulation materials which, of course, contribute to the inability of occupants to hear audible warning devices.

This relative ineffectiveness of audible warning devices suggests that greater reliance should be placed on visual warning devices. It has long been recognized that flashing lights are effective and, accordingly, most emergency vehicles are now equipped with flashing red, amber or blue lights. Although these flashing emergency warning lights may be sufficiently effective at night or other times of relatively low ambient illumination, they are relatively ineffective in daylight hours because of the intensity of the illumination is considerably filtered by the colored lenses or envelopes.

A principle function for a vehicle warning device is to alert the occupants of nearby vehicles, at the earliest possible time, of the presence or approach of an emergency vehicle. This suggests the use of high intensity light to which the human eye is most susceptible. One source of such light is the high beam portion of standard headlights, which not only contain a powerful white light but which have been designed and are normally adjusted for most effective illumination. While such high beam headlights, burning continuously, would not be particularly effective as a warning device, they would be particularly effective if made to flash alternately in the distinctive pattern of other dual-warning light devices.

SUMMARY OF THE INVENTION

It is an object of this invention to provide a novel control circuit for warning devices.

Another object of this invention is to provide a novel control circuit for alternating illumination of the headlamps of a motor vehicle.

A further object of this invention is to provide a novel headlamp control circuit for a motor vehicle which permits the alternate flashing of the high beam filaments of the left- and right-hand headlamps, and which permits conventional operation of headlight controls when flashing is not desired.

A still further object of this invention is to provide a novel headlamp control circuit for a motor vehicle which permits alternate flashing of the high beam filaments of the left- and right-hand headlamps, and which provides an override control for normal operation and illumination by the high beam filaments.

These objects are accomplished by a control circuit which includes conventional circuitry and controls for the high beam filaments of a pair of headlamps; which includes a parallel circuit including an alternating-type flasher device for alternate energization of the high beam filaments; and which includes diode means connecting each high beam filament to the conventional circuit control to permit the alternate energization by the flasher circuit.

DESCRIPTION OF THE DRAWINGS

Other objects and advantages of the invention will become apparent to those skilled in the art from the reading of the following description taken in connection with accompanying drawing in which the single FIURE is a schematic circuit diagram of a preferred form of the invention as applied to a four-headlamp vehicle.

DESCRIPTION OF THE PREFERRED EMBODIMENTS

The control circuit to be described is adapted for use with conventional headlight systems, either four-lamp or two-lamp systems, for passenger automobiles and other vehicles. The control circuit includes a circuit portion for controlling the headlamps, both high beams and low beams, in a conventional manner and a parallel circuit portion for effecting the alternating flashing operation of the high beam filaments, with diode means for permitting the flashing operation of the high beam filaments on the one hand and continuous energization of the high beam filaments on the other hand. The control circuit functions identically for either two-lamp or four-lamp systems. Reference is made to high beam filaments and low beam filaments and, as so referred to, these filaments are independent of the lamp envelopes in which they may be contained.

The drawing depicts a schematic diagram of a control circuit as applied to a conventional four headlamp system which includes left- and right-hand multifilament lamps 6 and 7, respectively, and left- and right-hand single filament lamps 8 and 9, respectively. Left-side high beam filaments 10 are contained in the headlamps 6 and 8; and right-side high beam filaments 11 are contained in the headlamps 7 and 9. Low beam filaments 12 and 13 are contained in the headlamps 6 and 7, respectively. The voltage source for these filaments may be a conventional automotive battery 14.

The circuit for conventional operation of the headlamps is traced from the battery 14 through conductors 15 and 16 to on-off switch 17 which represents the conventional headlight switch mounted on an automobile dashboard, for example. Connected in series with the switch 17, through conductor 18, is an alternating double-throw switch 19 which represents the conventional floor-mounted, foot-actuated dimmer switch found in most automobiles. The switch element is illustrated as engaging the low beam contact of the switch 19; and this contact communicates with the low beam filaments through conductor 20, conductor 21 connected to the low beam filament 12 and conductor 22 connected to the low beam filament 13. A conductor 23 connects the high beam terminal of the switch 19 to a terminal 25 of a terminal mounting board 24, for example. The mounting board 24 also includes terminals 26 and 27; and this terminal board represents a means for interrupting the conventional headlight circuit to attach the flasher control circuit to be described. Alternatively, the terminals 25, 26 and 27 may represent conventional twist-type connectors for joining the conductors. The high beam filaments 10 are connected to the terminal 26 by means of conductor 28; and the high beam filaments 11 are connected to the terminal 27 through conductor 29. Were it not for the provision of the flasher circuit, the conductors 23, 28 and 29 would be connected together to provide for continuous energization of the high beam filaments 10 and 11 through the switches 17 and 19.

To provide for the intermittent alternating operation of the high beam filaments 10 and 11, it is necessary, of course, to interrupt electrical communication between these filaments. This is done at the terminal board 24; and power for the continuous and simultaneous energization of the high beam filaments is provided through conductors 31, 32 and 33 connected to the terminals 25, 26 and 27, respectively, and communicating with a flasher control module of subcircuit 34. The conductors 31, 32 and 33 represent, for example, a three-wire cable which would connect the terminal mounting board 24 and the flasher module 34. Within the flasher module the conductor 31 is connected to the conductors 32 and 33 through respective diodes 35 and 36, which diodes permit current flow in the direction only from the conductor 31 to the conductors 32 and 33, respectively. It will now be seen that the current flow for high beam filaments 10 passes from switch 19 through conductors 23 and 31, diode 35, and conductors 32 and 28; and that the current flow for high beam filaments 11 flows through conductors 23 and 31, diode 36, and conductors 33 and 29. These filaments will, of course, be energized continuously and simultaneously through this circuit.

The circuit portion for alternate flashing operation of the high beam filaments 10 and 11 provides an alternative path for the flow of current from the battery 14 to the filaments. This circuit, as traced from the battery 14, includes conductor 15, conductor 37, on-off switch 40 which represents a dashboard-mounted flasher switch, for example, and conductor 41 connected to the input terminal of a flasher device 42. It will be understood that any form of flasher device or circuit may be employed which provides for the alternating energization of a controlled device, such as the lamp filaments 10 and 11. The above-mentioned conductors 32 and 33 are connected to the respective output terminals of the flasher device 42. It will now be seen that, when the flasher switch 40 is closed, the high beam lamp filament 10 is energized through the flasher 42 and conductors 32 and 28, while the high beam filament 11 is energized through the flasher and conductors 33 and 29. The diodes 35 and 36 prevent flow of current from either of the conductors 32 or 33 to the other. The diodes then permit the alternate flashing operation of the filaments 10 and 11, and also permit the simultaneous operation through the conventional control circuit.

The flasher module 34 represents a convenience unit which includes the flasher device or circuit 42 and the diodes 35 and 36 and associated circuitry which may be readily mounted within the vehicle and conveniently connected to the conventional headlamp circuit to convert the vehicle for emergency use.

As is conventional in automotive vehicles, the body or frame provides the common or ground conductor for the control circuitry; and, accordingly, the lamp filaments 10, 11, 12 and 13 and the battery 14 are represented as being grounded to the vehicle body represented by common conductor 45.

The control circuit may be applied just as readily to a vehicle having a two-headlamp system. This system is illustrated by the above-described schematic circuit modified to eliminate the lamps 8 and 9 and associated high beam filaments. This circuit includes, then, left- and right-hand lamps 6 and 7, each of which contains high beam and low beam filaments.

The operation of the control circuit will now be briefly summarized for several operating conditions.

For normal nighttime operation and illumination the headlight switch 17 is closed and the dimmer switch 19 is actuated to select either the high beam filaments 10 and 11 or the low beam filaments 12 and 13 as desired.

When the dimmer switch is actuated for high beam operation, the current flows to the high beam filaments through the common conductors 23 and 31 and is then divided for the high beam filament circuits. Current for the high beam filament 10 flows through diode 35 and conductors 32 and 28, while current for the high beam filament 11 flows through diode 36 and conductors 33 and 29. These filaments are then energized simultaneously and continuously in a conventional manner.

For emergency flasher operation of the high beam filaments while running in daylight, it is only necessary to close the dashboard-mounted flasher switch 40 which energizes the flasher circuit. The high beam filaments 10 and 11 are then energized alternately by the flasher 42 through the above-mentioned respective conductors 32, 28, 33 and 29. For this operation, the low beam filaments 12 and 13 are not normally energized.

When it is desired to convert to flasher operation while running at night with the headlights switched to low beam, as illustrated in the FIGURE, it is only necessary to close the flasher switch 40 which will immediately effect alternating energization of the high beam filaments 10 and 11. This does not affect the low beam filaments 12 and 13 which remain energized to provide continuous illumination.

If the vehicle is running at night with the high beam filaments energized, through the dimmer switch 19 for illumination at the time it is desired to switch to flasher operation, it is necessary to actuate the dimmer switch 19 to the low beam position in conjunction with the closing of the flasher switch 40. Since the circuit for conventional operation and the circuit for flasher operation provide parallel paths for current flow to the high beam filaments 10 and 11, the current flow through the conventional circuit and dimmer switch 19 will override the current flow of the flasher circuit and render the flasher circuit ineffective. For this reason, it is necessary to actuate the dimmer switch to the low beam position to effect flasher operation.

As indicated above, when riding at night under emergency conditions, the low beam filaments will provide continuous illumination while the high beam filaments provide the visual warning signal along with incidental flashing illumination. Should it be desired at any time to obtain additional illumination for running purposes, either momentarily or for a longer period, this is done readily by merely actuating the dimmer switch 19 to effect continuous illumination by the high beam filaments 10 and 11 and render ineffective the flasher dimmer circuit. By the same token, when the need for the additional illumination is past, the flashing operation of the high beam filaments is again effected immediately by merely actuating the dimmer switch 19 to the low beam position.

What has been described is a novel, simple and effective control circuit for effecting alternative and complimentary use of a vehicle headlamp system in a conventional manner for illumination or in a distinctive flashing manner for use of the warning device on an emergency vehicle.

A feature of this invention is that the vehicle headlights may be operated in a perfectly normal and conventional manner for illumination, when emergency flasher operation is not required. For emergency flasher operation during daylight running, the flasher control circuit is entirely independent of the conventional headlamp circuit.

A particular feature of the invention is that, while running at night under emergency flasher operation of the high beam filaments, the flasher operation is readily and quickly overridden to provide full high beam illumination when necessary; and the emergency flasher operation is quickly and readily resumed when the necessity for the high beam illumination has passed.

What is claimed is:

1. In a vehicle including at least one pair of headlamps, each of said headlamps having a high beam filament and a low beam filament, a control circuit for selectively passing current through said filaments comprising:
 a. a direct current voltage source having first and second terminals;
 b. first circuit means electrically interconnecting each of said filaments with said first terminal of said voltage source;
 c. first switch means having an input terminal and first and second output terminals for alternately electrically interconnecting said input terminal with said first and second output terminals;
 d. second circuit means interconnecting each of said low beam filaments with said first output terminal of said first switch means;
 e. third circuit means for interconnecting the input terminal of said first switch means with the second terminal of said voltage source;
 f. automatic switching means having an input terminal and first and second output terminals, said automatic switching means operative to automatically alternately electrically interconnect said input terminal with said first and second output terminals;

g. fourth circuit means for electrically interconnecting the input terminal of said automatic switching means with the second terminal of said voltage source;

h. fifth circuit means electrically interconnecting said first output terminal of said automatic switching means with one of said high beam filaments;

i. sixth circuit means electrically interconnecting said second output terminal of said automatic switching means with the other of said high beam filaments; and j. first and second diode means, each having first and second terminals, which exhibit between the two terminals a low impedance to current flowing in one direction and a high impedance to current flowing in the opposite direction, said first diode means being electrically interconnected between said fifth circuit means and the second output terminal of said first switch means, said second diode means electrically interconnected between said sixth circuit means and said second output terminal of said first switch means.

2. A control circuit as set forth in claim 1 including a second pair of headlamps, each having a high beam filament therein, the high beam filament of one of said second pair of headlamps electrically connected between said first circuit means and said fifth circuit means, and the high beam filament of the other one of said second pair of headlamps electrically connected between said first circuit means and said sixth circuit means.

3. The control circuit as set forth in claim 1 wherein said third circuit means includes a switch for selectively opening and closing a circuit through said voltage source.

4. The control circuit as set forth in claim 1 wherein said fourth circuit means includes a switch for selectively opening and closing a circuit through said voltage source.